Sept. 11, 1962

A. W. SMITH 3,053,093

EXTENDED RANGE PIRANI GAUGE

Filed Aug. 5, 1959

To Vacuum System

INVENTOR.
ALAN W. SMITH
BY
John F. Hohmann
ATTORNEY

INVENTOR.
ALAN W. SMITH

United States Patent Office 3,053,093
Patented Sept. 11, 1962

3,053,093
EXTENDED RANGE PIRANI GAUGE
Alan W. Smith, Cleveland, Ohio, assignor to Union Carbide Corporation, a corporation of New York
Filed Aug. 5, 1959, Ser. No. 831,891
3 Claims. (Cl. 73—399)

This invention relates to pressure measuring devices of the Pirani gauge type and more particularly refers to such devices having a range of sensitivity from atmospheric pressure to $10^{-5}$ mm. Hg.

Pirani gauges are pressure measuring devices which are well known in industry. Their operation takes advantage of the fact that the resistance of some metals is dependent upon the heat conductivity of their environment. The heat conductivity in turn is determined by pressure. This phenomenon is advantageously used by placing a metal, whose resistance is dependent upon the heat conductivity of its environment, in an evacuated container, sealing the container from the surrounding atmosphere but keeping it open to the system under study. The pressure in the system therefore becomes the pressure in the container and the resistance of the metal in the container varies in accord therewith.

In the past, Pirani gauges have utilized metal wires as the sensing element and a Wheatstone bridge as the measuring circuit. Thermistors are generally two electrode variable resistance elements wherein the resistance is a function of temperature. The electrodes are usually made of single or polyphase semiconductors which have high temperature coefficients of resistance. Thermistors have recently been used in place of metal wires as sensing elements for Pirani gauges. These elements have been found very useful especially in the high pressure region from about $10^{-1}$ mm. Hg up to atmospheric pressure. Additionally, platinum wires have been found to be effective pressure determinants at much lower pressures, from about $10^{-5}$ mm. Hg up to about $10^{-2}$ mm. Hg. For many purposes the use of two or more gauges to measure pressure over a given range is cumbersome and unsatisfactory in that the operator must constantly balance out the readings of the gauges in order to properly determine the pressure in the system under study.

It is therefore the primary object of this invention to provide a single Pirani gauge which accurately determines the pressure of a system in the range from $10^{-5}$ mm. Hg to atmospheric pressure.

It is another object of this invention to provide a unique electric circuit to be used in conjunction with such a Pirani gauge.

These objects are fulfilled by this invention which resides in a Pirani gauge comprising a container sealed to the atmosphere but open to the system under study having a thermistor and a platinum ribbon therein.

Understanding of this invention will be facilitated by reference to the accompanying drawing in which.

The heart of the instant invention lies in the fact that a platinum ribbon and a thermistor connected in parallel within an evacuated container, sealed to the atmosphere but open to the system under study, supplement each other to the extent that the extremities of their pressure sensitive regions overlap, and in this overlapping region the pressure dependence of resistance is not merely additive but is actually synergistic. The pressure in the system under study, which is substantially the pressure within the Pirani gauge container, is determined by comparing the platinum ribbon-thermistor resistance to a fixed value resistance, which is under constant pressure and temperature conditions, outside the Pirani gauge container. This comparison is carried out by means of a modified Wheatstone bridge circuit wherein the Pirani gauge forms one leg of the bridge and the fixed resistance forms another leg of the bridge. In this modified bridge circuit, the fixed resistance is connected in series with the thermistor and in parallel with the platinum ribbon, which is also in parallel with thermistor, thereby forming a "delta" circuit. The galvanometer or other bridge measuring device is connected in Y with the thermistor and the fixed resistance. It has been determined that this type of circuit works with optimum efficiency if the value of the fixed resistance is about the same as that of the platinum ribbon. At very low pressures where the platinum is most resposnive to pressure, the resistance of the thermistor becomes very low so that it may be represented as a short circuit. Because of this, the resistance of the Pirani gauge is represented almost totally by that of the platinum ribbon which is most pressure-sensitive in this region. The pressure of the system under study is therefore obtained substantially by comparing the resistance of the platinum ribbon with that of the fixed value resistor. Conversely, at relatively high pressures, the resistance value of the platinum ribbon approaches a higher, constant value and acts as a fixed resistor. Under these conditions, the pressure is measured substantially by comparing the thermistor resistance to that of the fixed resistor.

Figure 1:
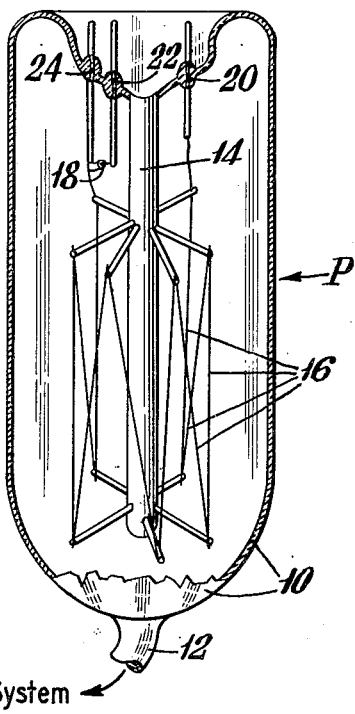
FIG. 1 is an elevation of a Pirani gauge according to this invention with part being broken away.

Referring to the accompanying drawing and more particularly to FIG. 1 thereof, a Pirani gauge P constructed according to the preferred form of this invention comprises an evacuated bulb 10 which is closed to the atmosphere but is connected to the system under study by a tube 12; a rod 14 within the bulb, which acts as a support for a platinum wire 16; a thermistor 18, connected in parallel with the platinum wire 16; and three terminals 20, 22 and 24 within the bulb 10 to facilitate connecting the Pirani gauge P to the rest of the circuit.

Figure 2:
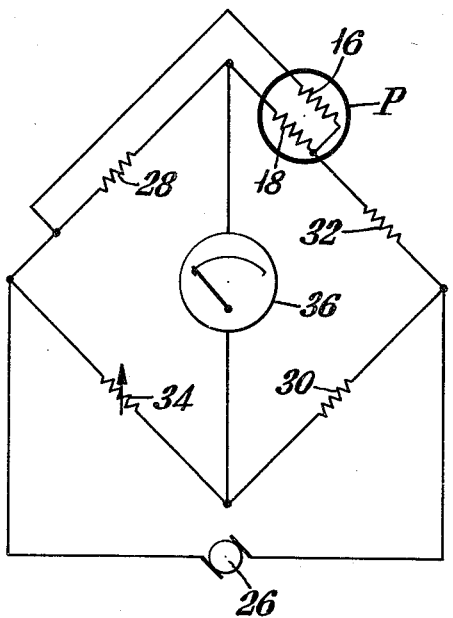
FIG. 2 is a circuit diagram of the electrical elements which are useful in the practice of this invention.

This circuit is shown in FIG. 2 and comprises a power supply 26 connected across a modified Wheatstone bridge circuit whose legs comprise two fixed value resistors 28 and 30; a fixed value resistor 32 in series with the Pirani gauge P; and a step type variable resistor 34. The power supply 26 is connected to the bridge circuit at a point between one fixed value resistor 30 and the resistor 32 in series with the Pirani gauge P; and between the step type variable resistor 34 and the fixed value resistor 28. The platinum wire 16 is connected in parallel with the thermistor 18 and also with the fixed resistor 28, this latter connection being between the power supply 26 and the fixed resistor 28. The pressure determined by the Pirani gauge is measured by this circuit by means of a measuring device 36 which compares the resistance of the elements of the Pirani gauge P with the value of the fixed resistance 28. This measuring device 36 is connected to the bridge circuit at a point between the fixed resistor 30 and the step type variable resistor 34; and between the fixed value resistor 28 and the thermistor 18 of the Pirani gauge P.

While in most Wheatstone bridge circuits, the quantity being measured is determined by varying a variable resistor, which forms one of the legs of the bridge, to the point where there is no current flowing through the measuring device, it has been found expedient in this particular application to have all the resistors of the fixed value type and measure the small amount of unbalance current flowing through the measuring device. This measured amount of current is dependent upon the resistance through the Pirani gauge and is therefore directly related to the pressure measured by the gauge. This method of translating the bridge circuit reading directly into pressure is of primary use in industrial application. The step type resistor mentioned above being a type of variable resistor, is employed as a compensating as well as a measuring resistor to obviate the possible necessity for changing resistors when working at different pressure levels. This element is really a fixed resistance at each step. It is, of course, within the scope of this invention to use the conventional means of determining the resistance in a Wheatstone bridge circuit by the use of a variable resistor and a null galvanometer or recorder.

More specifically, the Pirani gauge of this invention utilizes a ribbon of platinum 0.001 inch thick and 0.01 inch wide. While it is practical to use a wire of suitable dimensions, the speed of response has been found to be improved by the use of a flat ribbon. The ribbon was brazed onto platinum wire supports using pure silver and a very small flame. The thermistor was contained within a small glass bead and had 0.001 inch platinum lead wires. These leads were also sealed onto platinum supports with pure silver. The thermistor and the platinum ribbon wire were connected in parallel with one common terminal which was connected in series to a 10,000 ohm resistor. The other two leads were connected across a 200 ohm resistor, and the second platinum ribbon lead series connected to a 11,111 ohm resistor having 0.1 ohm steps therein. The 10,000 ohm resistor was series connected to a 1,000,000 ohm resistor which was in turn series connected to the 11,111 ohm step type resistor to complete a full Wheatstone bridge circuit. The measuring device consisted of a 10 ohm to 90,000 ohm variable resistor in parallel with a 10 millivolt recorder, with one lead of the recorder connected to the varying lead of the variable resistor. This arrangement allowed a portion of the variable resistor to be in series with the recorder while the remainder thereof was in parallel with the recorder. This measuring device was connected between the 1,000,000 ohm resistor and the 11,111 ohm step type resistor, and between the 200 ohm resistor and the thermistor. Power for the circuit was supplied by a 500 volt generator having an allowable variation of only 0.1 percent which was connected in parallel with the 1,000,000 ohm resistor and the 11,111 ohm step type resistor. The whole Pirani gauge assembly was mounted in a dewar flask, one with an evacuated double wall construction, with an aluminum foil cover to stabilize it against short-range temperature fluctuation and placed in an air conditioned room to stabilize it against long-term temperature fluctuation. The thus assembled Pirani gauge and circuit was then tested by measuring the pressure of various systems by comparing its resistance to that of the fixed 200 ohm resistor.

Figure 3:
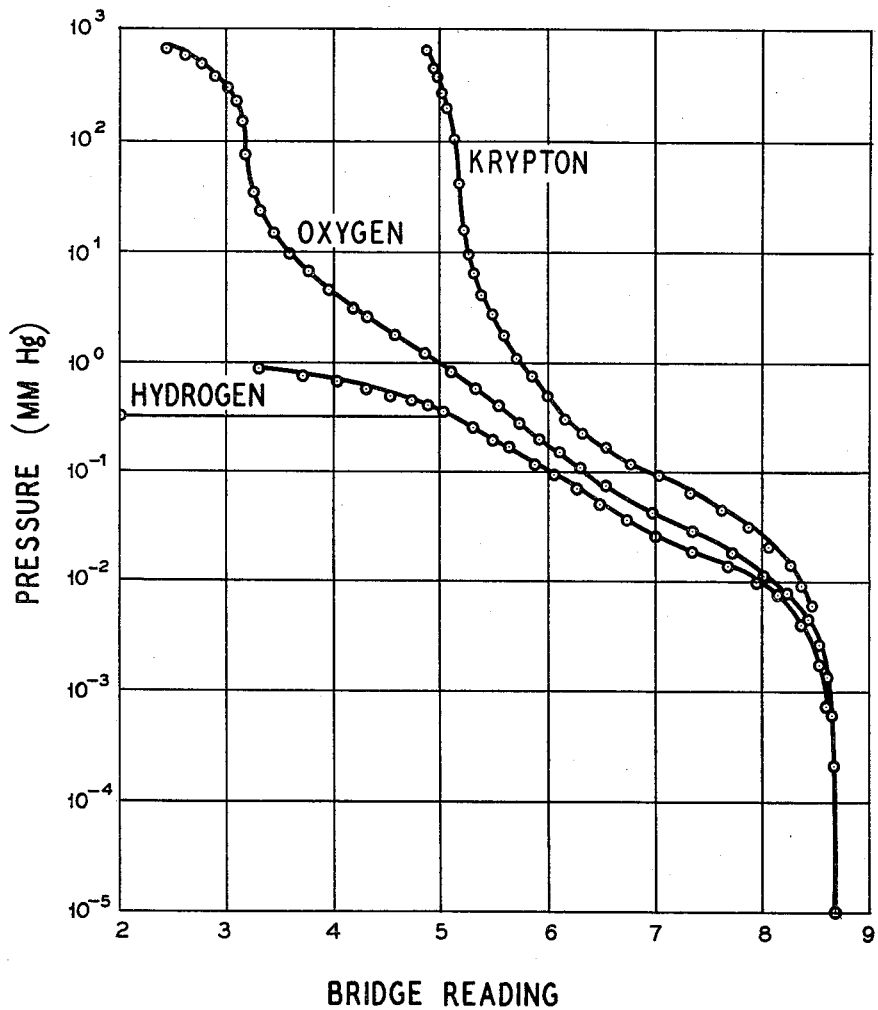
FIG. 3 is a series of curves, the data for which were obtained through use of the Pirani gauge herein disclosed.

The results of these tests appear in graphical form in FIG. 3 of the accompanying drawings, wherein the bridge reading at various pressures for oxygen, hydrogen, and krypton gas is plotted against these pressures as confirmed by a mercury manometer and as checked by a mercury McLeod gauge and an Octoil-S-manometer. On this plot, the bridge reading is in thousands of ohms. It is to be noted that the curve for each gas is slightly different pointing up the fact that the inherent conductivity of each gas in question must be considered before using this gauge to measure the pressure thereof. It is to be noted that the gauge of this invention must be calibrated against a known standard before it can be effectively used. The bridge reading corresponding to any given pressure is dependent upon the values of the fixed resistors which have been here designated as 10,000 ohms and 1,000,000 ohms, respectively. Thus, the curves may be moved to the right or the left on FIG. 3 by changing these values. It is also to be noted, with reference to the curves presented herein, that although there is a small change in the bridge reading with a corresponding large relative change in the pressure being measured when operating in the very low range of pressures, the sensitivity of the Pirani gauge described herein permits accurate pressure determination to the range of $10^{-5}$ mm. Hg absolute.

What is claimed is:

1. In a Pirani gauge adapted to measure pressure within a system which gauge includes a container sealed to the atmosphere and tubular passage means in communication with said system, the combination therewith of a thermistor and a platinum resistor in said container, said container having terminal means for connecting said thermistor and platinum resistor into a Wheatstone bridge circuit including a fixed-value resistor and a power supply, said terminal means being adapted to connect said thermistor into said circuit in series with said fixed-value resistor and across said power supply, and to connect said platinum resistor into said circuit parallel with said thermistor and fixed-value resistor and across said power supply.

2. The combination of claim 1, wherein the resistance value of the platinum resistor and the fixed-value resistor is about the same under operating conditions.

3. The combination of claim 1 wherein the temperature-responsive platinum resistor is a predetermined length of platinum ribbon.

References Cited in the file of this patent

UNITED STATES PATENTS

| 1,266,570 | Farnsworth | May 21, 1918 |
| 1,448,540 | Houskeeper | Mar. 13, 1923 |
| 2,865,203 | Gruber | Dec. 23, 1958 |